US009392809B2

(12) United States Patent
Binley et al.

(10) Patent No.: US 9,392,809 B2
(45) Date of Patent: Jul. 19, 2016

(54) APPARATUS AND PROCESS FOR PREPARING FROZEN CONFECTIONERY PRODUCTS

(71) Applicant: Conopco, Inc., Englewood Cliffs, NJ (US)

(72) Inventors: Gary Norman Binley, Ashstead (GB); Zhimin Shao, Hangzhou (CN)

(73) Assignee: CONOPCO, INC., Englewood Cliffs, NJ (US)

( * ) Notice: Subject to any disclaimer, the term of this patent is extended or adjusted under 35 U.S.C. 154(b) by 0 days.

(21) Appl. No.: 14/389,060

(22) PCT Filed: Mar. 26, 2013

(86) PCT No.: PCT/EP2013/056410
§ 371 (c)(1),
(2) Date: Sep. 29, 2014

(87) PCT Pub. No.: WO2013/149889
PCT Pub. Date: Oct. 10, 2013

(65) Prior Publication Data
US 2015/0086691 A1  Mar. 26, 2015

(30) Foreign Application Priority Data

Apr. 5, 2012 (WO) ................ PCT/CN2012/000433
May 23, 2012 (EP) ..................................... 12169126

(51) Int. Cl.
*A23P 1/12* (2006.01)
*A23G 9/28* (2006.01)
(Continued)

(52) U.S. Cl.
CPC *A23G 9/288* (2013.01); *A23G 9/28* (2013.01); *A23G 9/283* (2013.01); *A23G 9/322* (2013.01); *A23G 9/506* (2013.01); *A23L 1/0076* (2013.01); *A23P 1/12* (2013.01); *A23G 2220/14* (2013.01)

(58) Field of Classification Search
CPC ...................... A23G 9/28–9/285; A23G 9/288; A23G 9/20; A23G 9/506; A23G 9/46; A23G 9/485; A23G 2220/14; A23G 2220/02; A23G 9/322; A23P 1/12–1/125; A23L 1/0076–1/0079

USPC .................. 426/515–517, 524, 565, 317; 425/461–467, 72.1
See application file for complete search history.

(56) References Cited

U.S. PATENT DOCUMENTS 1,951,694 A * 3/1934 Goulstone .............. A23G 9/282 141/100
2,313,060 A * 3/1943 Friedman ............... A23G 9/282 425/132

(Continued)

FOREIGN PATENT DOCUMENTS

CN        1795737        7/2006
CN      102186354        9/2011
(Continued)

OTHER PUBLICATIONS

IPRP2 in PCTEP2013056410, Mar. 19, 2014.
(Continued)

*Primary Examiner* — Drew Becker
(74) *Attorney, Agent, or Firm* — Foley & Lardner LLP

(57) ABSTRACT

An apparatus for producing frozen confectionery products is provided, the apparatus comprising: means for supplying a frozen confection to the inlets of a nozzle; the nozzle comprising a chamber and an extrusion plate, wherein the extrusion plate defines one or more apertures; the apertures having a width of from 1 to 5 mm and a length of at least 10 mm; means for moving the nozzle in the opposite direction to the direction of extrusion. A process for producing frozen confectionery products, the process comprising: supplying a frozen confection to a nozzle, the nozzle comprising a chamber and an extrusion plate, wherein the extrusion plate defines one or more apertures; wherein the apertures have a width of from 1 to 5 mm and a length of at least 10 mm; extruding the frozen confection from the chamber of the nozzle through the apertures of the extrusion plate; and simultaneously moving the nozzle in the opposite direction to the direction of extrusion; and stopping the flow of the frozen confection is also provided.

6 Claims, 4 Drawing Sheets

(51) Int. Cl.
*A23G 9/32* (2006.01)
*A23G 9/50* (2006.01)
*A23L 1/00* (2006.01)

(56) References Cited

U.S. PATENT DOCUMENTS

| | | | | |
|---|---|---|---|---|
| 2,419,654 | A * | 4/1947 | Moore | A23G 3/28 |
| | | | | 425/461 |
| 2,705,463 | A * | 4/1955 | Moore | A23G 3/28 |
| | | | | 222/137 |
| 3,344,751 | A * | 10/1967 | Cammack | A23G 3/0247 |
| | | | | 425/131.1 |
| 3,503,757 | A * | 3/1970 | Rubenstein | A23G 9/20 |
| | | | | 426/317 |
| 3,586,517 | A * | 6/1971 | Warre et al. | B30B 11/221 |
| | | | | 425/464 |
| 3,790,331 | A * | 2/1974 | Backer | A23G 3/0242 |
| | | | | 264/245 |
| 4,427,703 | A | 1/1984 | Schafer et al. | |
| 4,504,511 | A | 3/1985 | Binley et al. | |
| 4,506,710 | A * | 3/1985 | Sawvel | B65B 39/00 |
| | | | | 141/100 |
| 4,648,829 | A * | 3/1987 | Cattani | A23G 9/04 |
| | | | | 264/294 |
| 4,834,635 | A * | 5/1989 | Groen | A23G 1/21 |
| | | | | 264/177.16 |
| 4,942,910 | A | 7/1990 | Hamamura | |
| 5,232,027 | A | 8/1993 | Tanaka et al. | |
| 5,283,070 | A * | 2/1994 | Bertrand | A23G 9/20 |
| | | | | 426/101 |
| 5,888,567 | A * | 3/1999 | Daouse | A23G 9/285 |
| | | | | 425/133.1 |
| 6,200,125 | B1 | 3/2001 | Akutagawa | |
| 2003/0085237 | A1 | 5/2003 | Kateman et al. | |
| 2003/0160073 | A1 | 8/2003 | Gispert Casino et al. | |
| 2006/0251783 | A1 | 11/2006 | D'Esposito et al. | |
| 2008/0317909 | A1 * | 12/2008 | Gispert | A23G 9/22 |
| | | | | 426/101 |
| 2011/0200718 | A1 | 8/2011 | Swertvaegher et al. | |

FOREIGN PATENT DOCUMENTS

| | | |
|---|---|---|
| EP | 1068803 | 1/2001 |
| EP | 2177109 | 4/2010 |
| JP | 11346658 | 6/1998 |
| JP | 2003092995 | 9/2001 |
| JP | 2003092995 | 4/2003 |
| WO | WO2010063542 | 6/2010 |
| WO | WO2011086058 | 7/2011 |

OTHER PUBLICATIONS

Search Report in CN2012000433, Jan. 17, 2013.
Search Report in EP12169126, Jun. 28, 2013.
Search Report in PCTCN2012000433, Jan. 17, 2013.
Search Report in PCTEP2013056410, Jul. 9, 2013.
Written Opinion in EP12169126, Jun. 28, 2013.
Written Opinion in PCTCN2012000433, Jan. 17, 2013.
Written Opinion in PCTEP2013056410, Jul. 9, 2013.

\* cited by examiner

APPARATUS AND PROCESS FOR PREPARING FROZEN CONFECTIONERY PRODUCTS

TECHNICAL FIELD OF THE INVENTION

The present invention relates to an apparatus and process for producing frozen confectionery products, more particularly a process for preparing frozen confectionery products having interesting decorative shapes with fine detail.

BACKGROUND TO THE INVENTION

Ice cream cone products, such as Cornetto™ are popular and well-known. These products typically consist of a wafer cone filled with ice cream. Consumers are continually looking for new eating experiences, and conventional cone products may be perceived as somewhat old-fashioned and uninteresting. For example, they have a familiar shape with small flutes on the top of the ice cream.

It is known to fill containers, such as cones, by extruding ice cream from a nozzle which moves in the opposite direction relative to the direction of extrusion. For example, in the industrial production of cone products, such as Cornetto™, the cone is filled by a nozzle which is located inside the cone at the start of dispensing, and which moves up as the cone is filled. This ensures that the ice cream goes all the way to the bottom of the cone. U.S. Pat. No. 4,942,910 discloses a process for making shaped frozen confections in which a nozzle moves simultaneously in a circular path in the horizontal plane, and linearly in the vertical direction, so that the overall motion is in a spiral path. This produces a shaped frozen confection.

Nonetheless, there remains a need for an improved method for producing frozen confection products which have an attractive and appealing appearance, in particular with fine detail.

BRIEF DESCRIPTION OF THE INVENTION

We have now devised an apparatus and method which overcomes these problems. Accordingly, in a first aspect, the present invention provides an apparatus for producing frozen confectionery products, the apparatus comprising means for supplying a frozen confection to the inlets of a nozzle;
the nozzle comprising a chamber and an extrusion plate, wherein the extrusion plate defines one or more apertures;
the apertures having a width of from 1 to 5 mm and a length of at least 10 mm;
means for moving the nozzle in the opposite direction to the direction of extrusion.

In a second aspect, the present invention provides a process for producing frozen confectionery products, the process comprising supplying a frozen confection to a nozzle, the nozzle comprising a chamber and an extrusion plate, wherein the extrusion plate defines one or more apertures; wherein the apertures have a width of from 1 to 5 mm and a length of at least 10 mm;
extruding the frozen confection from the chamber of the nozzle through the apertures of the extrusion plate; and
simultaneously moving the nozzle in the opposite direction to the direction of extrusion; and
stopping the flow of the frozen confection.

Preferably the speed of motion of the nozzle is the same as the speed of extrusion of the ice cream.

Preferably the apertures have a width of from 2 to 4 mm, such as about 3 mm.

Preferably the frozen confection is extruded into a receptacle, such as a cup, tub or cone.

DETAILED DESCRIPTION OF THE INVENTION

The narrow apertures of the apparatus result in thin streams of frozen confection which produce a fine extrusion pattern. We have found that if the nozzle remains stationery during extrusion, these streams are deformed by the frozen confection which follows. However, by moving the nozzle in the opposite direction to the flow of frozen confection, well-defined, highly decorative shapes are produced. Once the shape has been formed, the flow of the frozen confection is stopped, typically by means of a valve.

The products produced may consist of ice cream or other frozen confection in receptacles such as cups, tubs or cones. The volume of frozen confection dispensed in each operation is preferably from 30 to 300 ml, preferably from 50 to 200 ml, such as about 100 ml.

Figure 3:
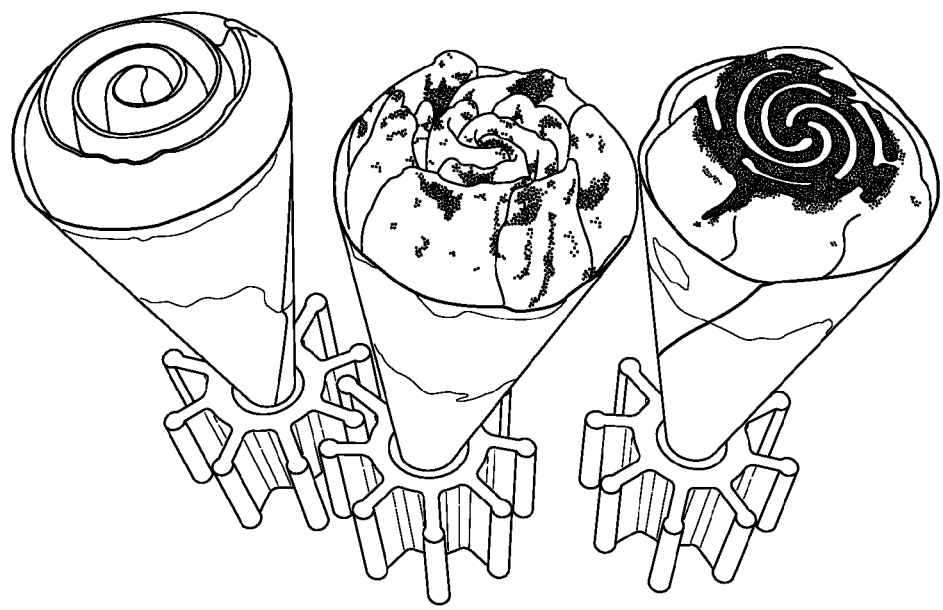
FIG. 3 shows examples of products which can be produced by the apparatus and method of the present invention.

This process can produce very attractive decoration on the top surfaces of cone, cup and tub products. The shapes that can be produced consist of thin walls of frozen confection which are arranged to form shapes for example a spiral, a rose or a tulip, as shown in FIG. 3. The precise appearance is controlled by the size, shape and location of the apertures in the extrusion plate and the dosing volume and flow rate of the frozen confection. For example, for a given extrusion plate and speed of motion of the nozzle, increasing the flow rate of the ice cream results in a product having wider features.

In order to retain the shape formed during extrusion, the walls should not be so thin that they collapse under their own weight. Thus high walls need to be thicker. Also, in order to retain the shape formed during extrusion, the frozen confection is preferably at a temperature of −5° C. or below on extrusion. Frozen confections which contain low amounts of fat are preferably extruded at lower temperatures, such as −7° C. or below.

Figure 1:
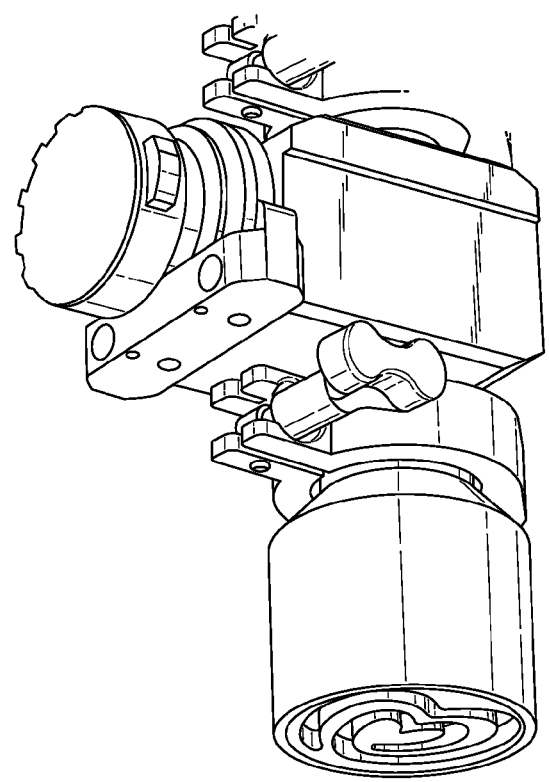
FIG. 1 shows a nozzle including an extrusion plate with a single long, thin aperture in the form of a heart shape.
Figure 2:
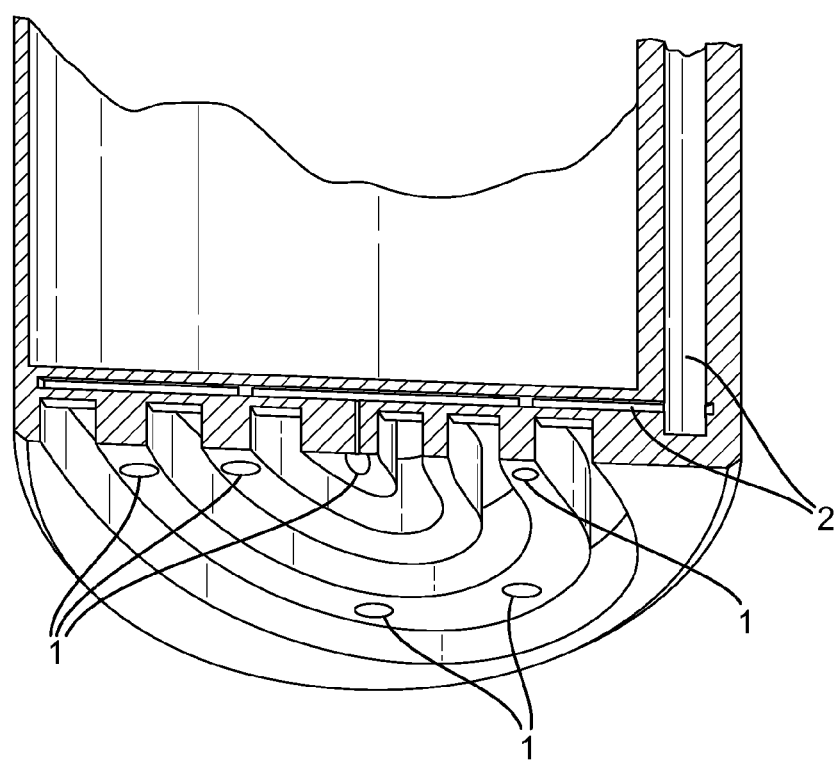
FIG. 2 shows a cross section of an embodiment of the extrusion plate with further openings between the apertures of the plate.

In a preferred embodiment of the invention the extrusion plate of the apparatus has further openings between the apertures. These openings are connectable to means for forcing a gas from these further openings. Such an embodiment is shown in FIG. 2 where the further openings 1 communicate with an air passage 2 which is connectable to the means for forcing a gas into this air passage 2 and hence from the further openings 1. In operation, this ability to force a gas, such as air, from these further openings serves to keep the various streams of the extruded confection separate from one another and allows for the production of particularly detailed products with delicate designs which are akin to the petals of a flower.

A single nozzle can be used to fill a single receptacle. Alternatively an array of nozzles can be used to decorate the surface of a larger product (such as a 1 liter tub) with multiple portions.

EXAMPLES

Figure 4:
FIG. 4 shows further examples of products which can be produced by the apparatus and method of the present invention.

FIGS. 3 and 4 show products formed using the apparatus and the process of the invention. It can therefore be readily seen that the present invention is capable of providing extruded ice cream products with very fine and detailed decorative finishes to their surfaces.

The invention claimed is:

1. A process for producing frozen confectionery products, the process comprising
    supplying a frozen confection to a nozzle, the nozzle comprising a chamber and an extrusion plate, wherein the extrusion plate defines one or more apertures; wherein the apertures have a width of from 1 to 5 mm and a length of at least 10 mm;
    extruding the frozen confection from the chamber of the nozzle through the apertures of the extrusion plate; and
    simultaneously moving the nozzle in the opposite direction to the direction of extrusion; and
    stopping the flow of the frozen confection;
    wherein the speed of motion of the nozzle is the same as the speed of extrusion of the ice cream; and
    wherein a gas is forced from further openings located between the apertures of the extrusion plate.

2. A process according to claim 1 wherein the frozen confection is extruded into a receptacle.

3. A process according to claim 1 wherein the frozen confection is extruded at a temperature of −5° C. or below.

4. A process according to claim 1 wherein the step of extruding the frozen confection provides adjacent extruded walls of the frozen confection.

5. A process according to claim 4 wherein the gas forced from the further openings between the apertures is directed between the adjacent extruded walls and is configured to separate the adjacent extruded walls from one another.

6. A process according to claim 5 wherein the apertures define a nested arrangement of curved shapes configured to form the adjacent extruded walls into a shape of a flower portion.

* * * * *